March 17, 1942. H. O. MADDOX 2,276,500
STARTING DEVICE
Filed Dec. 6, 1940 3 Sheets-Sheet 1

Inventor
Henry O. Maddox

By Clarence A. O'Brien
Attorney

March 17, 1942.  H. O. MADDOX  2,276,500
STARTING DEVICE
Filed Dec. 6, 1940  3 Sheets-Sheet 2
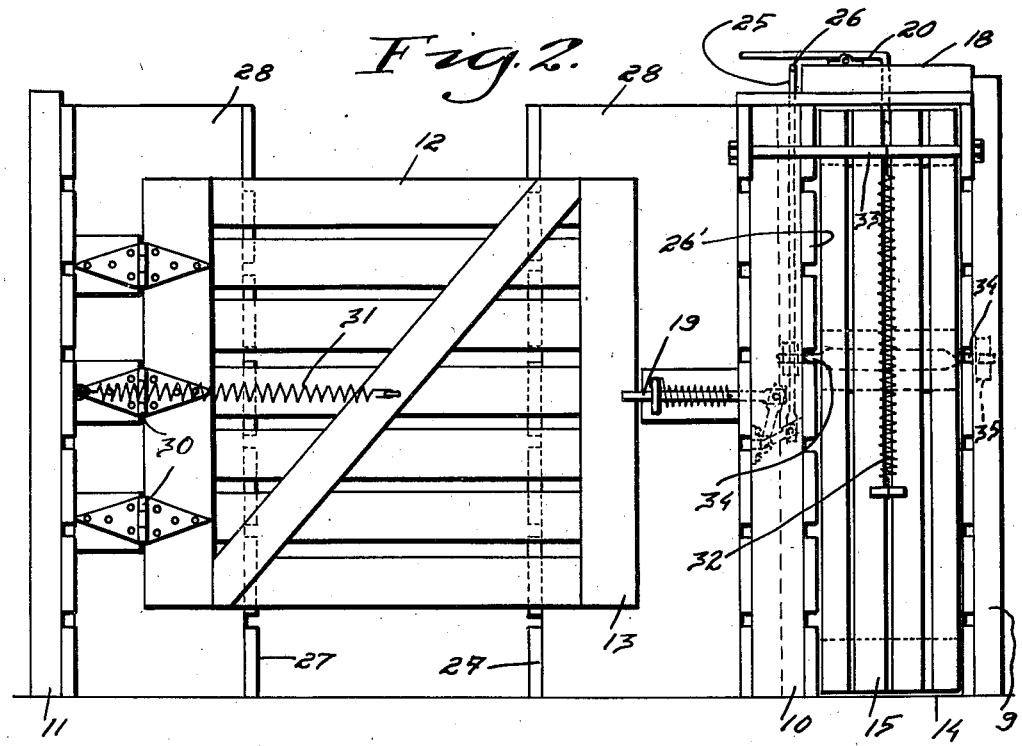
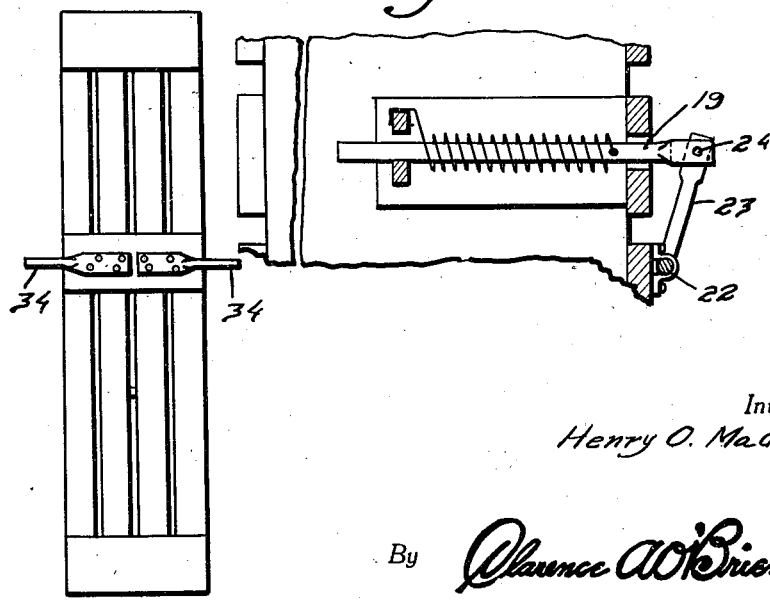
Inventor
Henry O. Maddox
By *Clarence A. O'Brien*
Attorney March 17, 1942.    H. O. MADDOX    2,276,500
STARTING DEVICE
Filed Dec. 6, 1940    3 Sheets-Sheet 3
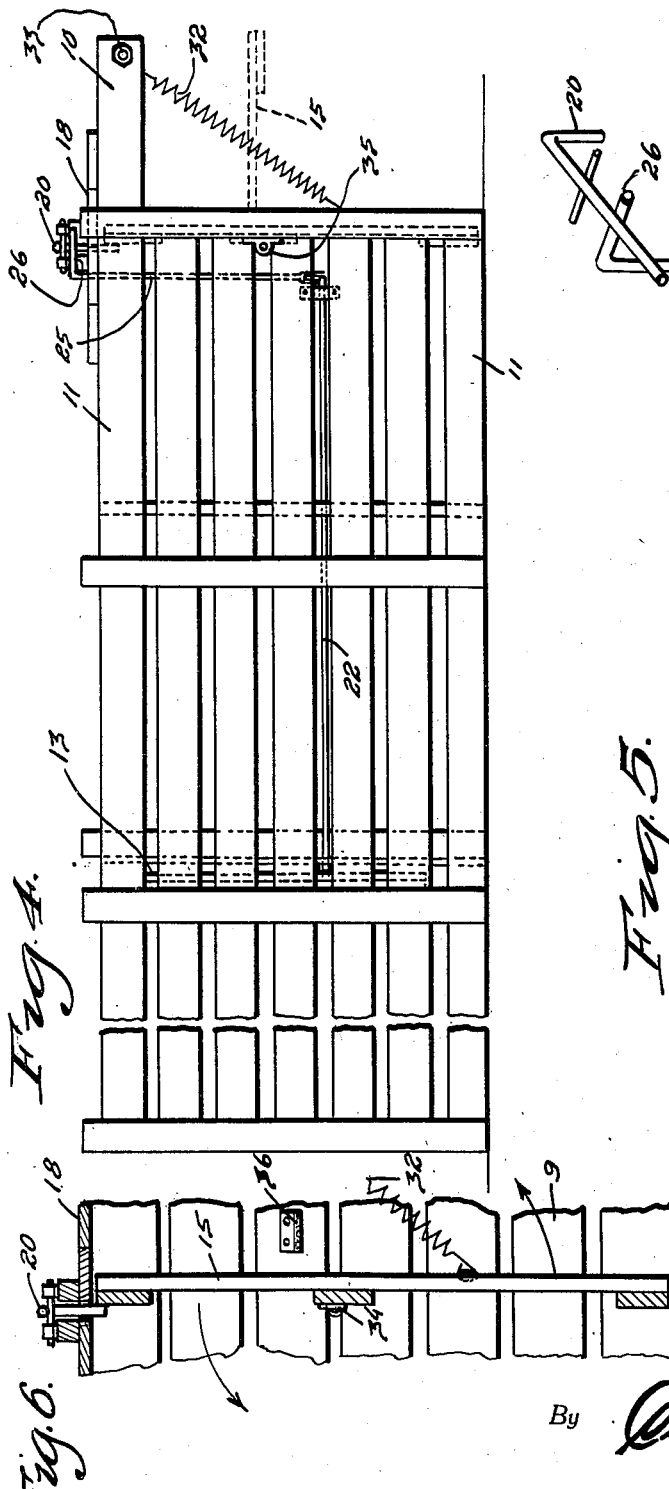
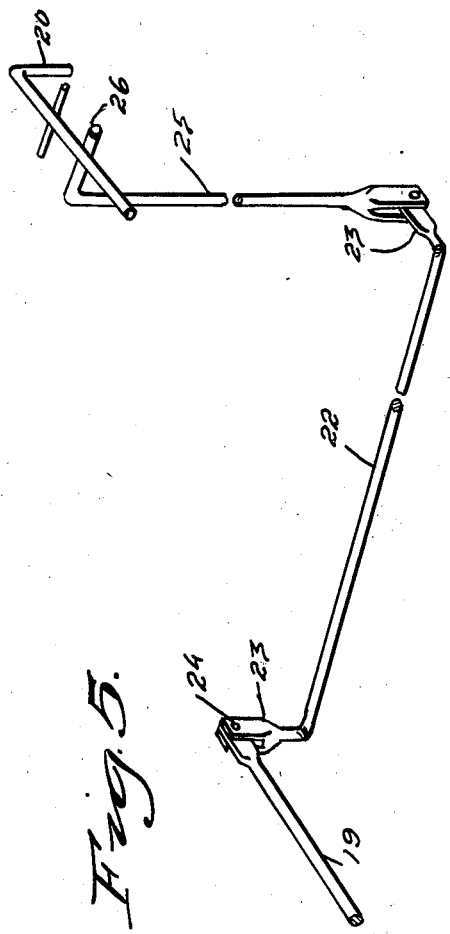
Inventor
Henry O. Maddox
By Clarence A. O'Brien
Attorney Patented Mar. 17, 1942

2,276,500

UNITED STATES PATENT OFFICE 2,276,500

STARTING DEVICE

Henry O. Maddox, Luling, Tex.

Application December 6, 1940, Serial No. 368,946

2 Claims. (Cl. 119—15.5)

This invention relates to a starting device especially adapted for use in animal roping or lassoing contests and relates more particularly to starting stalls whereby the horse and rider as well as the animal to be roped or lassoed may be released in accordance with set rules for a roping or lassoing contest. The primary object of the invention is the provision of a device of the above stated character which may be readily set up for use and will provide an elevated platform for the starter or referee and a starting stall for the animal or steer and a second starting stall for the horse and rider and a release means for said stalls operated by the starter or referee from said platform so that the animal or steer may be at a given place and free to act at will when the horse and rider is released from the stall in accordance with the rules of the roping or lassoing contest and thereby eliminate disputes frequently caused by the horse or rider starting in the contest prior to the steer reaching a given place and being free to act at will.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which Figure 1 is a top plan view illustrating a starting device constructed in accordance with my invention.

Figure 2 is an end elevation of the device showing the self-opening doors and the latch means therefor.

Figure 3 is a front elevation illustrating one of the doors.

Figure 4 is a side elevation showing a portion of the device and the door control means mounted thereon.

Figure 5 is a fragmentary perspective view of the door control means.

Figure 6 is a fragmentary sectional view illustrating one of the doors and the latch means therefor.

Figure 7 is a fragmentary sectional view illustrating the latch means for the other door.

Figure 1:
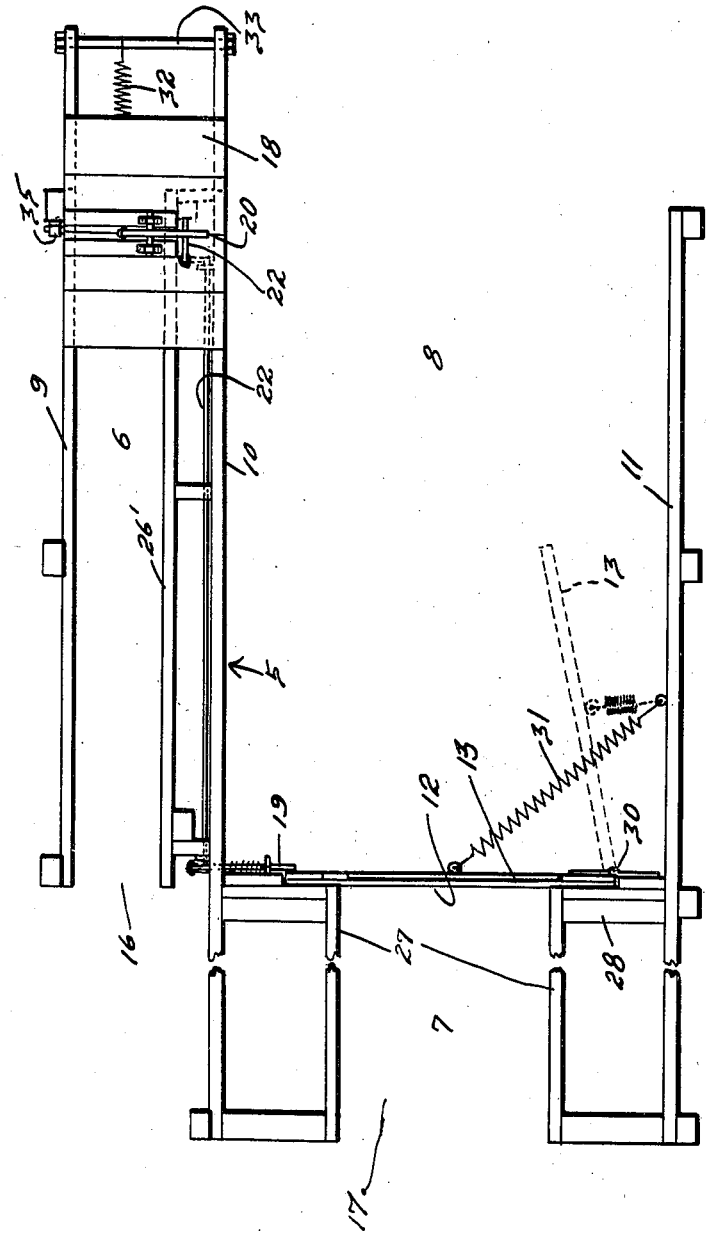

Referring in detail to the drawings, the numeral 5 indicates a starting device consisting of stalls 6 and 7 and a partly confined area 8.

To form the stalls 6 and 7 as well as the area 8 fence sections 9, 10 and 11 are provided. The fence sections 10 and 11 cooperate in defining the area 8 as well as the stall 7, the exit of which is indicated by the character 12 controlled by a self-opening gate 13. The fence sections 9 and 10 define the stall 6, the exit of which is indicated by the character 14 and said exit is controlled by a self-opening hinged gate 15. The animal or steer used in the roping contest is placed or corralled in the stall 6 and may be driven therein by way of the entrance 16 which must be guarded by an attendant when the animal or steer is occupying the stall 6.

The stall 7 accommodates the horse and rider. Entrance to the stall 7 may be by way of the rear end thereof indicated by the character 17.

By referring to Figure 1 it will be seen that the exit 14 of the stall 6 is arranged in advance to the exit 12 of the stall 7 so that the animal or steer may leave the stall 6 and be free to act at will before it is possible for the horse and rider to arrive in the vicinity of the animal or steer due to the fact that the horse and rider must pass through the area 8 before reaching a point opposite the exit to the stall 6.

A platform 18 is arranged upon the fence sections 9 and 10 above the exit 14 on which the referee or starter may stand and have clear view of both of the exits of said stalls as well as the playing field.

A spring influenced slidable latch bolt 19 is provided for securing the gate 13 in a closed position. A combined treadle and latch element 20 is pivotally mounted on the platform and acts to secure the gate 15 in a closed position.

An operating rod 22 is journaled on the fence section 10 and parallels the latter and is provided with angularly disposed extremities 23, one of which is pivotally connected to the latch bolt 19, as shown at 24, and the other is pivotally connected to a rod 25 slidably mounted on the fence section 10 by extending through an opening provided in the platform 18 and terminating in a right angularly disposed extension 26.

The extension 26 underlies the combined treadle and latch 20 so that when the latter is depressed the operating shaft 22 will be rotated to retract the latch bolt 19 to free the gate 13 and at the same time release the gate 15. Thus it will be seen that both gates are under the control of the starter or referee standing upon the platform 18.

An auxiliary fence section 26' is arranged in the stall 6 adjacent the fence section 10 to prevent the animal in the stall 6 from interfering or contacting with the operating rod 22.

To reduce the area within the stall 7 over that provided by the fence sections 10 and 11, auxiliary fence sections 27 are provided having connection with the fence sections 10 and 11 by wall sections 28. One of the wall sections 28 provides a support for the slidable spring influenced latch bolt 19, while the other wall section provides a mounting for the gate 13, the hinges thereof being indicated by the character 30. A coil spring 31 is connected to the gate 13 and to the fence section 11 for urging the gate into an open position. The gate 13 swings about a vertical axis, while the gate 15 swings about a horizontal axis. A coil spring 32 is connected to the gate 15 and to a tie rod 33 connecting the fence sections 9 and 10 and located above the exit 14.

The gate 15 has pintles 34 arranged substantially intermediate its ends and which are received in journals 35 carried by the forward ends of the fence sections 9 and 10. A stop 36 is provided for limiting the movement of the gate 15 beyond a horizontal position when released from a closed position under the action of the spring 32.

In use, a steer or animal is driven into the stall 6, while the rider and horse takes a position within the stall 7. The referee or starter then may depress the treadle 20 at any desired time which may be selected which permits both gates to open so that the animal or steer may be driven from the stall 6 and reach a given point of freedom for action at will before the horse and rider may traverse the area 8 which is in accordance with rules specified for roping or lassoing contests. If the horse or pony becomes unruly then it can be released from the pen 7 by the referee pressing downwardly the member 25 through means of the bent part 26. This will release the latch 19 so that the gate 12 can open but the gate 15 remains closed so that the calf cannot escape.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a starting device for roping contests, a pair of stalls, one stall being arranged in advance of the other and to one side of said other stall, each stall having an exit opening in its front end, the advance stall being adapted to receive the animal to be roped and the rear stall the horse and roper, self opening gates for said exits, an elevated platform on the first stall adjacent the front end thereof for a starter, latch means for each gate and means for releasing the latch means simultaneously from the platform, or for releasing one latch means without releasing the other, said means including a horizontally arranged rod connected to a side of the first stall having its rear end bent and pivoted to the latch means of the rear stall, the front end of the rod being bent, a vertically extending rod at the front end of the first stall having its lower end pivoted to the front bent end of the first rod with its upper end passing through the platform and terminating in a horizontal portion and the latch of the first stall having a horizontal part passing over the horizontal part of the upper end of the vertical rod for depressing the vertical rod when the horizontal part of the latch means of the first pen is depressed to open the gate of the first stall, the horizontal part of the vertical rod acting as a handle for moving the rod downwardly to release the latch means of the gate of the rear stall.

2. A starting device for roping contests comprising three parallel fence sections, the first and second sections being spaced apart to form the first stall and the second and third sections being spaced a greater distance apart, means connected with the rear ends of the second and third sections for forming a second stall which opens out into the space between the front portions of the second and third sections, a self opening gate for the exit of each stall, a platform on the top of the front portion of the first stall for a starter, latch means for each gate and means on the platform for releasing both latch means simultaneously or for opening the latch means of the gate of the second stall without opening the latch means of the gate of the first stall.

HENRY O. MADDOX.